US012673345B2

(12) United States Patent
Huang et al.

(10) Patent No.: US 12,673,345 B2
(45) Date of Patent: Jul. 7, 2026

(54) COATING SYSTEM

(71) Applicant: CONTEMPORARY AMPEREX TECHNOLOGY (HONG KONG) LIMITED, Hong Kong (CN)

(72) Inventors: Siying Huang, Ningde (CN); Yaohui Wang, Ningde (CN); Yinxiang Lin, Ningde (CN); Chao Guo, Ningde (CN); Peng Jin, Ningde (CN); Jinlong Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 251 days.

(21) Appl. No.: 17/964,949

(22) Filed: Oct. 13, 2022

(65) Prior Publication Data

US 2023/0036043 A1 Feb. 2, 2023

Related U.S. Application Data

(63) Continuation of application No. PCT/CN2021/136575, filed on Dec. 8, 2021.

(30) Foreign Application Priority Data

Jan. 22, 2021 (CN) ........................ 202120187158.X

(51) Int. Cl.
*B05C 9/06* (2006.01)
*B05C 11/02* (2006.01)
(Continued)

(52) U.S. Cl.
CPC .............. *B05C 9/06* (2013.01); *B05C 11/025* (2013.01); *B05C 11/1026* (2013.01); *B05C 21/00* (2013.01)

(58) Field of Classification Search
CPC ........................................ B05C 5/0254–0266
See application file for complete search history.

(56) References Cited

U.S. PATENT DOCUMENTS 4,938,994 A * 7/1990 Choinski ............... B05C 5/0254 430/311
5,234,330 A * 8/1993 Billow .................. B05C 5/0254 425/467

(Continued)

FOREIGN PATENT DOCUMENTS

CN 101844125 A 9/2010
CN 108000976 A 5/2018

(Continued)

OTHER PUBLICATIONS

Decision to Grant a Patent issued May 21, 2024 in Japanese Patent Application No. 2022-556592 with English translation thereof.

(Continued)

*Primary Examiner* — Dah-Wei D. Yuan
*Assistant Examiner* — Stephen A Kitt
(74) *Attorney, Agent, or Firm* — XSENSUS LLP

(57) ABSTRACT

This application provides a coating system, and relates to the technical field of coating. The coating system may include a coating head, a feeding apparatus, and a valve. The coating head may be equipped with at least two dispensing cavities independent of each other. Each dispensing cavity may include a coating opening. The feeding apparatus may be connected to the dispensing cavity, and the feeding apparatus may be configured to feed a slurry to the dispensing cavity. The valve may be disposed between at least one dispensing cavity and the feeding apparatus, and configured to implement communication or disconnection between a corresponding dispensing cavity and the feeding apparatus.

11 Claims, 5 Drawing Sheets

(51) Int. Cl.
*B05C 11/10* (2006.01)
*B05C 21/00* (2006.01)

(56) References Cited

U.S. PATENT DOCUMENTS

| | | | | |
|---|---|---|---|---|
| 2002/0176945 | A1* | 11/2002 | Hudson | B05D 1/265 427/407.1 |
| 2004/0256496 | A1* | 12/2004 | Harris | B05C 5/0258 239/551 |
| 2008/0011781 | A1* | 1/2008 | Yajima | B05C 11/1039 222/189.11 |
| 2010/0247792 | A1 | 9/2010 | Emoto et al. | |
| 2011/0287171 | A1* | 11/2011 | Seo | B05C 5/0262 427/8 |

FOREIGN PATENT DOCUMENTS

| | | | | |
|---|---|---|---|---|
| CN | 109107829 | A | 1/2019 | |
| CN | 109261438 | A | 1/2019 | |
| CN | 210950110 | U | 7/2020 | |
| CN | 214390896 | U | 10/2021 | |
| EP | 2 415 530 | B1 | 12/2016 | |
| JP | 3848519 | B2 | 11/2006 | |
| JP | 2010-221205 | A | 10/2010 | |
| JP | 2011-041892 | A | 3/2011 | |
| JP | 2012-195061 | A | 10/2012 | |
| JP | 2012-206097 | A | 10/2012 | |
| JP | 2016-147216 | A | 8/2016 | |
| JP | 6212951 | B2 | 10/2017 | |
| JP | 2020-505750 | A | 2/2020 | |
| JP | 2020-131083 | A | 8/2020 | |
| KR | 10-2012-0012725 | A | 2/2012 | |
| KR | 20200114417 | A * | 10/2020 | H01M 4/0404 |
| WO | 2020/071713 | A1 | 4/2020 | |

OTHER PUBLICATIONS

Request for the Submission of an Opinion issued Jun. 2, 2024 in Korean Patent Application No. 10-2022-7034207 with English translation thereof.
Office Action issued Feb. 6, 2024 in Japanese Patent Application No. 2022-556592 with machine English translation thereof.
Office Action issued Sep. 19, 2023 in Japanese Patent Application No. 2022-556592, 10 pages.
Extended European Search Report issued Nov. 29, 2023 in European Patent Application No. 21920788.3, 8 pages.
International Search Report and Written Opinion mailed on Mar. 7, 2022, received for PCT Application PCT/CN2021/136575, filed on Dec. 8, 2021, 12 pages including English Translation.
Chinese Notification on Grant of Patent Right for Utility Model issued Sep. 15, 2021, in corresponding Chinese Patent Application No. 202120187158.X, 2 pages including English Translation.

* cited by examiner

COATING SYSTEM

CROSS-REFERENCE TO RELATED APPLICATIONS

This application is a continuation of International Application No. PCT/CN2021/136575, filed Dec. 8, 2021, which claims priority to Chinese Patent Application No. 202120187158.X, filed on Jan. 22, 2021 and entitled "COATING SYSTEM", each of which is incorporated herein by reference in its entirety.

TECHNICAL FIELD

This application relates to the technical field of coating, and in particular, to a coating system.

BACKGROUND

In an electrode plate coating process of a lithium battery, a single-layer and single-cavity coating head is used for coating, and a slurry is continuously sprayed on a current collector through a lip of the coating head, so as to achieve uniformity and consistency of areal density of a film. However, when a coating thickness is constant, a cavity pressure of the single-layer coating head is high, and is prone to abrade the lip and result in weight fluctuation during coating. Therefore, in the prior art, the slurry is applied on the current collector in a plurality of layers for several times to form a coating thickness on the current collector. In this way, the pressure in the cavity of the coating head is relatively low each time of coating, and the lip abrasion is reduced. However, because different layers of coating are formed at intervals, the layers are bonded inferiorly and prone to peel off from each other.

SUMMARY

Embodiments of this application provide a coating system to improve performance of bonding between layers of multi-layer coating.

An embodiment of this application provides a coating system, configured to coat a substrate to form an electrode plate. The coating system includes a coating head, a feeding apparatus, and a valve. The coating head is equipped with at least two dispensing cavities independent of each other. Each dispensing cavity includes a coating opening. The feeding apparatus is connected to the dispensing cavity, and the feeding apparatus is configured to feed a slurry to the dispensing cavity. The valve is disposed between at least one dispensing cavity and the feeding apparatus, and configured to implement communication or disconnection between a corresponding dispensing cavity and the feeding apparatus.

In the foregoing technical solution, the coating head is equipped with a plurality of dispensing cavities that each include a coating opening. Each dispensing cavity can perform a layer of coating correspondingly. Therefore, the same coating head can implement multi-layer coating, and can spread the slurry on the substrate in a plurality of layers for several times to form a given coating thickness on the substrate. In this way, the pressure in each dispensing cavity of the coating head each time of coating is lower than the pressure generated when the slurry is concentrated in one dispensing cavity, thereby reducing lip abrasion. In addition, the same coating head implements all layers of coating, so that different layers of coating are formed at relatively short intervals. In this way, all layers of coating can be implemented simultaneously, and the slurry flowing out of each coating opening can be bonded and attached at the lip of the coating head first, and then spread onto the substrate, so that different layers are bonded to each other more effectively and not prone to peel off from each other. In addition, the valve disposed between at least one dispensing cavity and the feeding apparatus enables the coating system to implement local thin-coating.

In some embodiments of this application, the coating system further includes a back roller. The back roller is configured to drive the substrate. An out-feed direction of each coating opening coincides with an extension direction of a diameter of the back roller.

In the foregoing technical solution, the out-feed direction of the coating opening is along a diameter direction of the back roller, thereby preventing the lip of the coating head from scraping the slurry.

In some embodiments of this application, an out-feed direction of the coating opening of one of the at least two dispensing cavities is arranged horizontally.

In the foregoing technical solution, the out-feed direction of one of the coating openings of the coating head is arranged horizontally, thereby preventing the lip of the coating head from scraping the slurry. The coating head vibrates up and down during a coating operation. The horizontally arranged coating opening vibrates up and down along with the coating head. In this way, the horizontally arranged coating opening changes positions merely in the vertical direction, but a horizontal distance between the coating opening and a center of the back roller remains unchanged, thereby avoiding an impact on the coating thickness of the slurry out of the coating opening, and helping to ensure coating quality.

In some embodiments of this application, the coating system further includes an adsorption apparatus. The adsorption apparatus is configured to keep an air pressure stable at the coating opening.

In the foregoing technical solution, the adsorption apparatus can keep the air pressure stable at the coating opening, so as to prevent the slurry at the coating opening from being affected by air flow fluctuations, increase affinity between the slurry and the substrate, increase coating uniformity, and in turn, improve the coating quality.

In some embodiments of this application, the coating system further includes a marking apparatus. The marking apparatus is located downstream of the coating head, and the marking apparatus is configured to mark an uncoated region of the substrate to identify a thin-coated position or an uncoated position.

In the foregoing technical solution, the disposed marking apparatus can mark the uncoated region of the substrate, so as to identify the thin-coated position or uncoated position and provide accurate positioning for subsequent die-cutting.

In some embodiments of this application, the number of the dispensing cavities is two. The coating head includes a lower die, a middle die, and an upper die. One dispensing cavity is formed between a lower surface of the upper die and an upper surface of the middle die, and another dispensing cavity is formed between a lower surface of the middle die and an upper surface of the lower die.

In the foregoing technical solution, the coating head includes a lower die, a middle die, and an upper die. After being combined, the middle die and the upper die form a dispensing cavity, and the middle die and the lower die form another dispensing cavity. In this way, it is convenient to disassemble the coating head for cleaning the interior of the dispensing cavity and replacing parts in the dispensing cavity.

In some embodiments of this application, the coating head further includes two spacers. The two spacers are disposed between the upper die and the middle die, and between the middle die and the lower die, respectively. The coating opening is disposed at the spacer.

In the foregoing technical solution, the thickness of the spacer can affect the coating thickness at the coating opening, and in turn, affect the coating weight. The coating weight can be adjusted by disposing spacers of different thicknesses between the upper die and the middle die, and between the middle die and the lower die, respectively.

In some embodiments of this application, the upper die is pivotally connected to the middle die, and the middle die is pivotally connected to the lower die. The coating head further includes a first die-clamping piece or structure and a second die-clamping piece or structure. The first die-clamping piece is configured to fix the upper die and the middle die when clamping the upper die to the middle die. The second die-clamping piece is configured to fix the middle die and the lower die when clamping the middle die to the lower die.

In the foregoing technical solution, the upper die is pivotally connected to the middle die, and the middle die is pivotally connected to the lower die, so that all components of the coating head are always connected together, and it is ensured that the relative position between the lower die, the middle die, and the upper die is fixed. In clamping the lower die to the middle die or clamping the middle die to the upper die, the two dies can be clamped together accurately without a need to recalibrate the positions of the dies. The first die-clamping piece and the second die-clamping piece can implement firm connection between the upper die and the middle die, and between the middle die and the lower die, respectively, so as to ensure stability of pressure and flow speed of the slurry in the two dispensing cavities, and in turn, improve the coating quality.

In some embodiments of this application, the number of the feeding apparatuses is at least two, and the feeding apparatuses are in one-to-one correspondence with the dispensing cavities. Each feeding apparatus includes a tank and a feeding pump. The feeding pump is configured to pump the slurry in the tank to the dispensing cavity.

In the foregoing technical solution, the feeding apparatuses are in one-to-one correspondence with the dispensing cavities, making it convenient to independently control the feeding speed and pressure of each dispensing cavity.

In some embodiments of this application, the valve includes a valve body, a first valve core, a second valve core, a first drive component or structure, and a second drive component or structure. The valve body includes an in-feed port, a back-feed port, and an out-feed port. The out-feed port communicates with the dispensing cavity, the in-feed port communicates with an outlet of the feeding pump, and the back-feed port communicates with the tank. The first drive component is configured to drive the first valve core to move in the valve body, so as to implement communication or disconnection between the in-feed port and the out-feed port. The second drive component is configured to drive the second valve core to move in the valve body, so as to implement communication or disconnection between the out-feed port and the back-feed port.

In the foregoing technical solution, the movement of the first valve core can implement communication or disconnection between the in-feed port and the out-feed port. The communication between the in-feed port and the out-feed port enables coating. The movement of the second valve core can implement communication or disconnection between the out-feed port and the back-feed port. At positions intended to be thin-coated or uncoated, through the second valve core and the communication between the out-feed port and the back-feed port, the slurry inside corresponding dispensing cavity can flow back to the tank to prevent the remaining slurry in the dispensing cavity from affecting uncoating or thin coating. In other words, the valve can feed the slurry to the coating head, and can also implement backflow of the slurry. When no coating is required, the slurry can flow back in time to prevent the slurry in the dispensing cavity from affecting effects of clearance coating or local thin coating.

BRIEF DESCRIPTION OF DRAWINGS

To describe technical solutions in embodiments of this application more clearly, the following outlines the drawings to be used in the embodiments. Understandably, the following drawings show merely some embodiments of this application, and therefore, are not intended to limit the scope. A person of ordinary skill in the art may derive other related drawings from the drawings without making any creative efforts.

Figure 1:
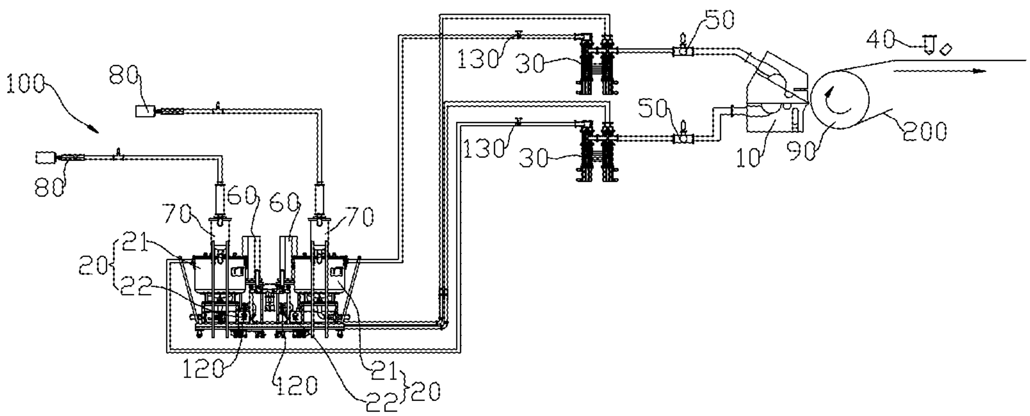
FIG. 1 is a schematic diagram of a coating system according to an embodiment of this application.

Reference numerals: 100—coating system; 10—coating head; 11—dispensing cavity; 11*a*—first dispensing cavity; 11*b*—second dispensing cavity; 12—upper die; 121—first groove; 122—first in-feed port; 123—first exhaust port; 124—auxiliary exhaust port; 13—middle die; 131—second groove; 132—second exhaust port; 14—lower die; 141—second in-feed port; 142—third groove; 143—fourth groove; 15—spacer; 151—pressure plate; 16—first hinge; 17—second hinge; 18—first die-clamping piece; 19—second die-clamping piece; 190—fixing back plate; 191—flip lever; 192—tuning mechanism; 1921—fixing plate; 1922—fastening screw; 193—tuning push-pull rod; 194—adhesive dispensing valve; 20—feeding apparatus; 21—tank; 22—feeding pump; 30—valve; 31—valve body; 311—in-feed port; 312—out-feed port; 313—back-feed port; 32—first valve core; 33—second valve core; 34—first drive component; 35—second drive component; 36—first sealing structure; 37—second sealing structure; 40—marking apparatus; 50—damper; 60—first filter; 70—second filter; 80—delivery system; 90—back roller; 110—adsorption apparatus; 120—flowmeter; 130—pressure sensor; 200—substrate; 300—coating measurement system; C—horizontal direction; D—coating width direction of coating opening.

DETAILED DESCRIPTION OF EMBODIMENTS

To make the objectives, technical solutions, and advantages of the embodiments of this application clearer, the following gives a clear and complete description of the technical solutions in the embodiments of this application with reference to the drawings in the embodiments of this application. Apparently, the described embodiments are merely a part of but not all of the embodiments of this application. The components described and illustrated in the drawings according to the embodiments of this application generally may be arranged and designed in a variety of different configurations.

Therefore, the following detailed description of the embodiments of this application provided with reference to the drawings is not intended to limit the scope of this application as claimed, but merely represents selected embodiments of this application. All other embodiments derived by a person of ordinary skill in the art based on the embodiments of this application without making any creative efforts fall within the protection scope of this application.

It is hereby noted that to the extent that no conflict occurs, the embodiments of this application and the features in the embodiments may be combined with each other.

It is hereby noted that similar reference numerals and letters indicate similar items in the following drawings. Therefore, once an item is defined in one drawing, the item does not need to be further defined or construed in subsequent drawings.

In the description of the embodiments of this application, it is hereby noted that an indicated direction or positional relationship is a direction or positional relationship based on illustration in the drawings, or a direction or positional relationship by which a product in use according to this application is usually placed, or a direction or positional relationship commonly understood by a person skilled in the art, and is merely intended for ease or brevity of describing this application, but does not indicate or imply that the indicated apparatus or component is necessarily located in the specified direction or constructed or operated in the specified direction. Therefore, the indicated direction or positional relationship is never to be understood as a limitation on this application. In addition, the terms “first”, “second”, and “third” are merely intended for distinct description, but not intended to indicate or imply order of precedence.

With the application and popularization of lithium-ion batteries in the fields such as communications, portable electronic products, electric vehicles, aerospace, watercraft, especially in the field of electric vehicles, requirements for a high cruising range and high safety performance are more intense, and higher requirements have been put forward on an electrode plate coating process of lithium-ion power batteries.

The coating technology of an extrusion coater is becoming mature, and has become a mainstream technique in the coating production process of lithium batteries.

Initially, power battery manufacturers use a single-layer and single-cavity coating head to coat a lithium-ion electrode plate in a coating process, and a slurry is continuously sprayed on a substrate through a lip of the coating head, so as to achieve uniformity and consistency of areal density of a film. The pressure in a cavity of the single-layer and single-cavity coating head is high, and is prone to cause lip abrasion. In addition, the process of abrading the lip leads to weight fluctuations during the coating, and the coating slurry is excessively thinned at the lip. The excessively thin slurry induces a safety hazard of lithium plating during charge-and-discharge cycles of a lithium-ion battery.

Therefore, another practice is put forward in which the same weight of coating slurry is spread onto the substrate in a plurality of layers through a plurality of coating heads. This practice not only ensures an appropriate coating weight but also reduces the slurry pressure in the cavity of each coating head, thereby reducing lip abrasion. However, this leads to a time difference between the coating heads, and the layers are bonded to each other inferiorly and prone to peel off from each other.

In view of this, an embodiment of this application provides a coating system 100, configured to coat a substrate 200 to form an electrode plate. A plurality of dispensing cavities 11 that each include a coating opening are disposed on the coating head 10. A valve 30 is disposed between at least one dispensing cavity 11 and a feeding apparatus 20, so that the coating system 100 can not only implement multi-layer coating to reduce abrasion of the lip of the coating head 10, but also implement clearance coating and thin coating.

It is hereby noted that the substrate 200 is a current collector of the electrode plate.

Figure 2:
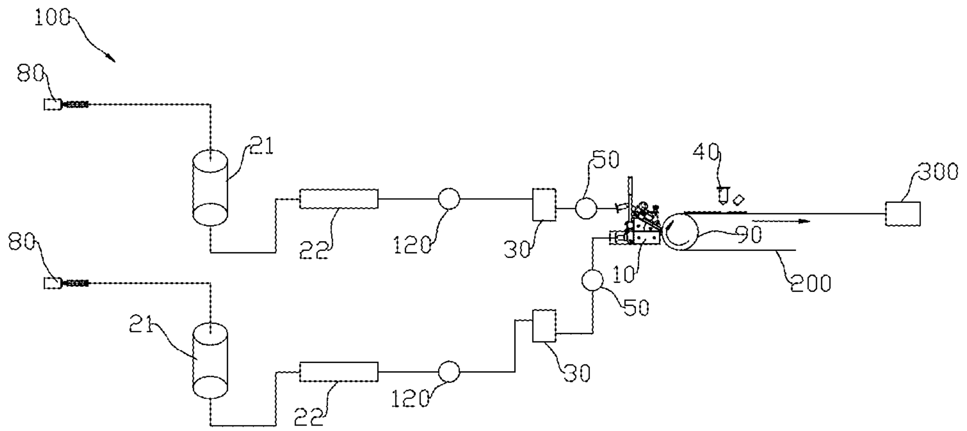
FIG. 2 is a simplified block diagram of the coating system shown in FIG. 1.

Referring to FIG. 1 and FIG. 2, FIG. 1 is a schematic diagram of a coating system 100 according to an embodiment of this application, and FIG. 2 is a simplified block diagram of the coating system 100 shown in FIG. 1. The coating system 100 includes a coating head 10, a feeding apparatus 20, and a valve 30. The coating head 10 is equipped with at least two dispensing cavities 11 independent of each other. Each dispensing cavity 11 includes a coating opening. The feeding apparatus 20 is connected to the dispensing cavity 11. The feeding apparatus 20 is configured to feed a slurry to the dispensing cavity 11. The valve 30 is disposed between at least one dispensing cavity 11 and the feeding apparatus 20, and the valve 30 is configured to implement communication or disconnection between a corresponding dispensing cavity 11 and the feeding apparatus 20.

The coating head 10 is equipped with a plurality of dispensing cavities 11 that each include a coating opening. Each dispensing cavity 11 can perform a layer of coating correspondingly. Therefore, the same coating head 10 can implement multi-layer coating, and can spread the slurry on the substrate 200 in a plurality of layers for several times to form a given coating thickness on the substrate 200. In this way, the pressure in each dispensing cavity 11 of the coating head 10 each time of coating is lower than the pressure generated when the slurry is concentrated in one dispensing cavity 11, thereby reducing lip abrasion. If the size of the coating opening is designed to be relatively large, the coating weight can be increased, and the capacity of the lithium battery can be increased.

In addition, the same coating head 10 implements all layers of coating, so that different layers of coating are formed at relatively short intervals. In this way, all layers of coating can be implemented simultaneously, and the slurry flowing out of each coating opening can be bonded and attached at the lip of the coating head 10 first, and then spread onto the substrate 200, so that different layers are bonded to each other more effectively and not prone to peel off from each other.

In addition, the valve 30 disposed between at least one dispensing cavity 11 and the feeding apparatus 20 enables the coating system 100 to implement local thin-coating.

In some embodiments, as shown in FIG. 1, the valve 30 is disposed between each dispensing cavity 11 and the feeding apparatus 20. If each valve 30 keeps communication between the corresponding dispensing cavity 11 and the feeding apparatus 20, the coating can be implemented at each coating opening. If some of the valves 30 intermittently disconnect the corresponding dispensing cavity 11 from the feeding apparatus 20 and the remaining valves 30 always keep communication between the corresponding dispensing cavity 11 and the feeding apparatus 20, the coating head 10 can implement local thin-coating. If all the valves 30 intermittently disconnect the corresponding dispensing cavity 11 from the feeding apparatus 20, the substrate 200 can be partly uncoated, that is, locally intermittent coating.

Figure 3:
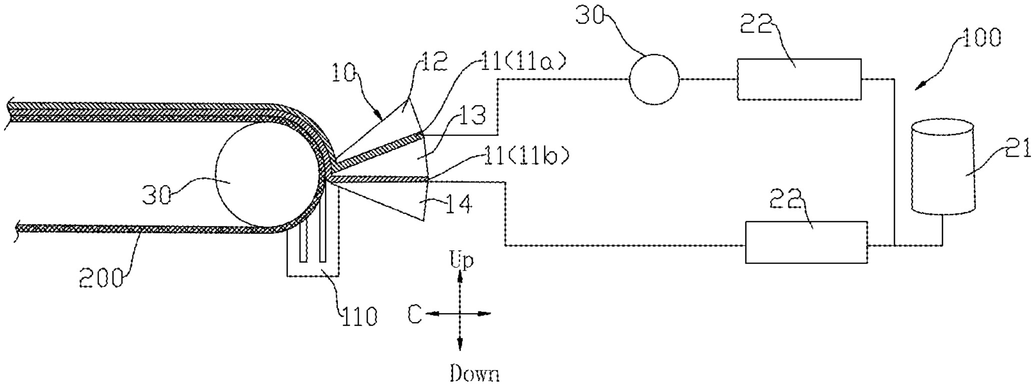
FIG. 3 is a simplified schematic diagram of a coating system according to an embodiment of this application.

In some embodiments, as shown in FIG. 3, the valve 30 is disposed between just one dispensing cavity 11 and the feeding apparatus 20, and the valve 30 is not disposed between other dispensing cavities 11 and the feeding apparatus 20. In this case, the valve 30 can intermittently disconnect the corresponding dispensing cavity 11 from the feeding apparatus 20 to thinly coat the substrate 200 locally. If the valve 30 always disconnects the corresponding dispensing cavity 11 from the feeding apparatus 20, the substrate 200 can be entirely thin-coated.

In some embodiments, the number of the feeding apparatuses 20 is at least two, and the feeding apparatuses 20 are in one-to-one correspondence with the dispensing cavities 11. Each feeding apparatus 20 includes a tank 21 and a feeding pump 22. The feeding pump 22 is configured to pump the slurry in the tank 21 to the dispensing cavity 11. The feeding apparatuses 20 are in one-to-one correspondence with the dispensing cavities 11, making it convenient to independently control the feeding speed and pressure of each dispensing cavity 11. The feeding pump 22 is a screw pump.

In some embodiments, depending on the number of dispensing cavities 11, the number of feeding apparatuses 20 is adjusted, so that the feeding apparatuses 20 are in one-to-one correspondence with the dispensing cavities 11. For example, if the number of dispensing cavities 11 is three, the number of feeding apparatuses 20 is set to three correspondingly.

In some embodiments, the number of feeding apparatus 20 may be one, and each dispensing cavity 11 is fed with the slurry by the same feeding apparatus 20.

In some embodiments, as shown in FIG. 3, the feeding apparatus 20 may include a tank 21 and a plurality of feeding pumps 22. The feeding pumps 22 are in one-to-one correspondence with the dispensing cavities 11. Each feeding pump 22 is configured to pump the slurry in the tank 21 into the corresponding dispensing cavity 11.

In some embodiments, the coating system 100 further includes a marking apparatus 40. The marking apparatus 40 is located downstream of the coating head, and the marking apparatus 40 is configured to mark an uncoated region of the substrate 200 to identify a thin-coated position or an uncoated position. To be specific, the marking apparatus 40 marks the uncoated region of the coated substrate 200 to identify a thin-coated position or uncoated position, so as to provide precise positioning for subsequent die-cutting. Definitely, the marking apparatus 40 may work together with the valve 30 to implement closed-loop control through a programmable logic controller (PLC), and mark a specified clearance position (uncoated position) or thin-coated position to enable precise detection and identification of a die-cutting position of a tab to be cut subsequently, so that a clearance position or thin-coated position is a preset position of a wound electrode plate. The marking apparatus 40 includes, but is not limited to, an ink jet apparatus. It is hereby noted that "downstream" means a later step of a processing process, and "a marking step performed downstream of the coating head 10" means a marking step performed after the coating step.

In some embodiments, the coating system 100 further includes a damper 50. The damper 50 is configured to balance pressure fluctuations during the flow of the slurry, and make the slurry flow steadily. The damper 50 may be a pulsation damper 50. The pulsation damper 50 is an apparatus specially designed to smoothly pulsate to accumulate pressurized liquid. The pulsation damper 50 may be a gasbag-type pulsation damper or a straight-through pulsation damper. The gasbag-type pulsation damper can achieve the purpose of storing and releasing energy by using compressibility of gas.

In some embodiments, the damper 50 is disposed between the tank 21 and the feeding pump 22. The damper 50 can eliminate the fluctuation of the feeding pressure caused by the change of the liquid level of the slurry in a bucket, and make the slurry in the feeding pump 22 flow steadily.

In some embodiments, the damper 50 is disposed between the feeding pump 22 and the valve 30. The damper 50 can eliminate the feeding pressure fluctuations induced by the feeding pump 22 and a movement impact induced by the opening and closing of the valve 30.

In some embodiments, the damper 50 may be disposed between the tank 21 and the feeding pump 22, and between the feeding pump 22 and the valve 30 concurrently.

In some embodiments, the damper 50 is disposed between the valve 30 and the coating head 10. The damper 50 can eliminate the feeding pressure fluctuations occurring before the slurry enters the coating head 10. In addition, a flowmeter 120 may be used to monitor a pump flow in real time, and work together with a coating measurement system 300 to implement closed-loop control and adjust a pump speed of the feeding pump 22 according to the coating situation.

In some embodiments, the damper 50 may be disposed between the tank 21 and the feeding pump 22, between the feeding pump 22 and the valve 30, and between the valve 30 and the coating head 10 concurrently. Alternatively, the damper 50 may be disposed between the feeding pump 22 and the valve 30, and between the valve 30 and the coating head 10.

In some embodiments, the coating system 100 further includes a first filter 60. The first filter 60 is disposed between the feeding pump 22 and the valve 30, or the first filter 60 is disposed between the valve 30 and the coating head 10, or the first filter 60 is disposed between the pump and the valve 30, and between the valve 30 and the coating head 10 concurrently, so that the slurry pumped out of the tank 21 enters the dispensing cavity 11 of the coating head 10 after being filtered by the first filter 60. The first filter 60 disposed improves the filtering effect of the slurry. The improved filtering effect of slurry particles improves the coating quality significantly.

When the damper 50 is disposed between the tank 21 and the feeding pump 22, the first filter 60 is disposed upstream of the damper 50. It is hereby noted that "upstream" indicates a step performed earlier in a processing process. To be specific, the first filter 60 is disposed between the tank 21 and the damper 50, and the slurry passes through the damper 50 after being filtered by the first filter 60. When the damper 50 is disposed between the valve 30 and the coating head 10, the first filter 60 is disposed upstream of the damper 50. To be specific, the first filter 60 is disposed between the valve 30 and the damper 50, and the slurry passes through the damper 50 after being filtered by the first filter 60. This ensures that the slurry pressure fluctuations caused by the slurry passing through the first filter 60 can be balanced by the damper 50.

In some embodiments, the coating system 100 further includes a second filter 70 and a delivery system 80. The delivery system 80 is configured to feed the slurry to the tank 21. The second filter 70 is disposed between the delivery system 80 and the tank 21, and configured to perform filtering between the delivery system 80 and the tank 21. The second filter 70 filters larger particles than the first filter 60. The first filter 60 is a three-element filter, and the second filter 70 is a rotary filter. Definitely, depending on actual needs, the first filter 60 and the second filter 70 may be of the same type. For example, both the first filter 60 and the second filter 70 are three-element filters, or both the first filter 60 and the second filter 70 are rotary filters.

In some embodiments, the coating system 100 is further equipped with a flowmeter 120 and a pressure sensor 130. The flowmeter 120 and the pressure sensor 130 can detect the slurry flow and the cavity pressure of the die in real time during the coating, and feed back a detection result to make an adjustment. The flowmeter 120 is disposed between the feeding pump 22 and the valve 30. The flowmeter 120 may be integrated with the coating measurement system 300 such as a 13/X-ray system to implement a closed-loop control system, thereby making the coating weight more uniform and improving the consistency of the coating weight. The pressure sensor 130 is disposed between the tank 21 and a back-feed port 313 (to be described later) of the valve 30.

Figure 4:
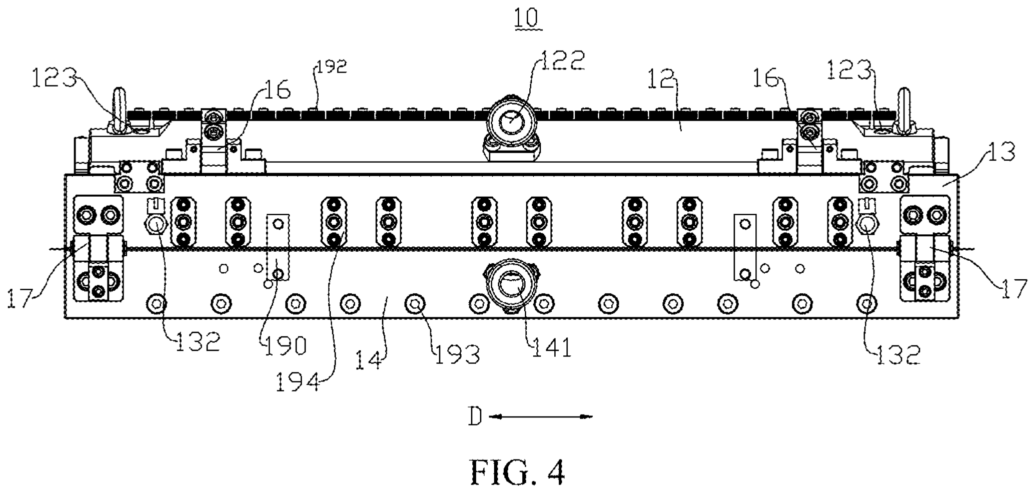
FIG. 4 is a schematic diagram of the coating head shown in FIG. 1 from a first viewing angle.
Figure 5:
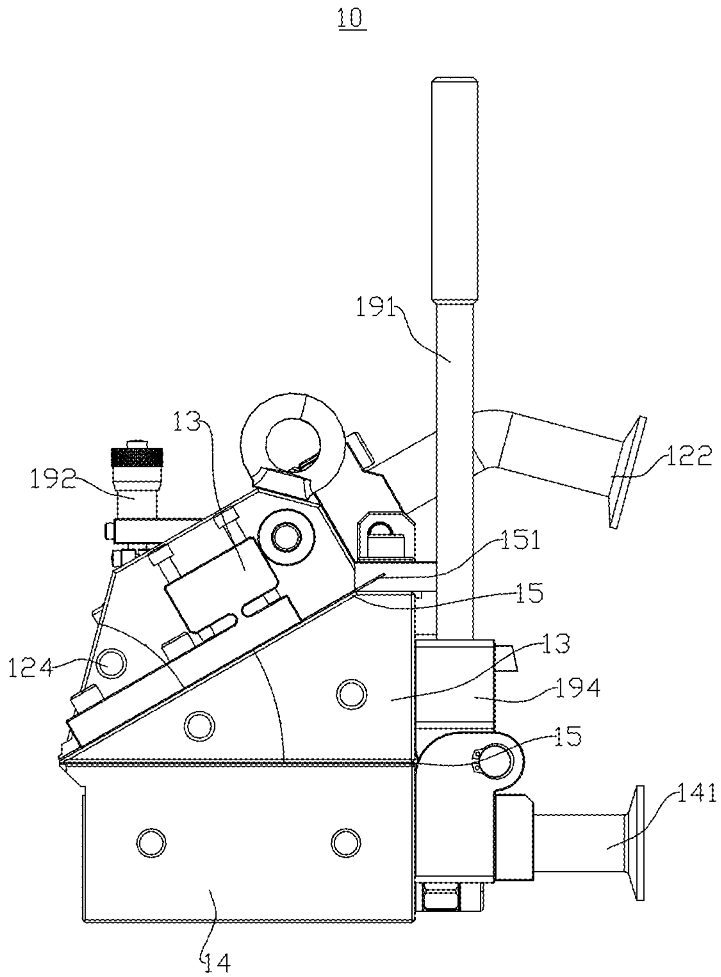
FIG. 5 is a schematic diagram of the coating head shown in FIG. 1 from a second viewing angle.
Figure 6:
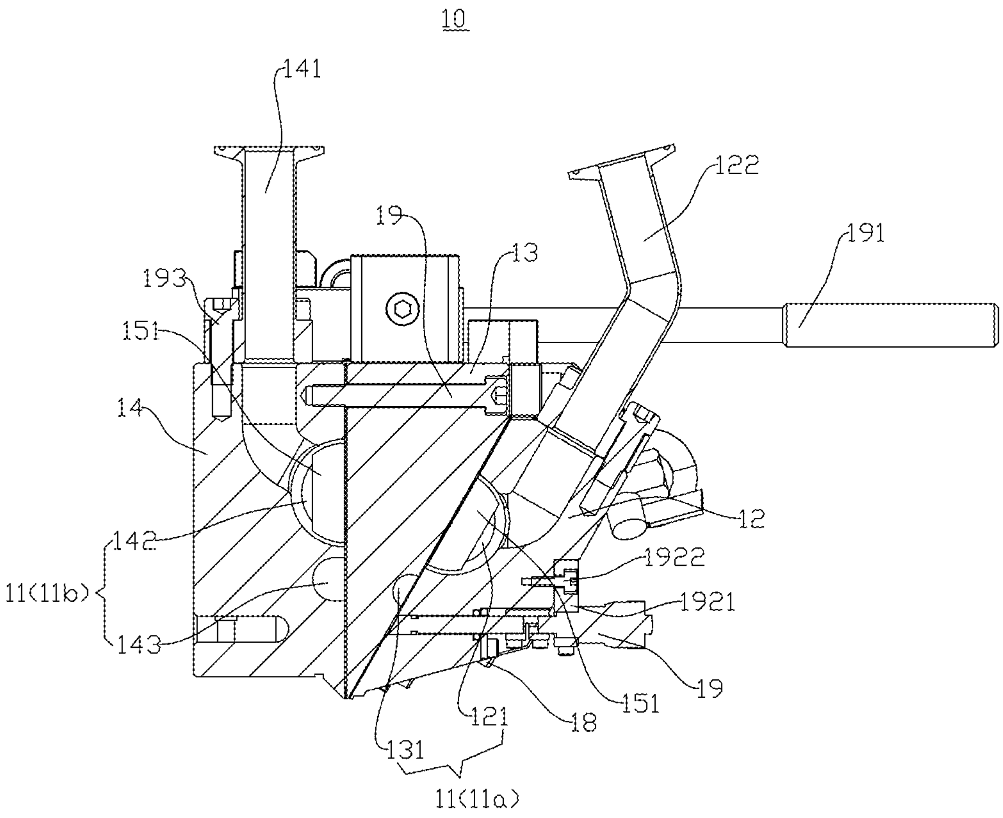
FIG. 6 is a sectional view of the coating head shown in FIG. 1.

As shown in FIG. 4 to FIG. 6, FIG. 4 is a schematic diagram of the coating head 10 from a first viewing angle; FIG. 5 is a schematic diagram of the coating head 10 from a second viewing angle; and FIG. 6 is a sectional view of the coating head 10.

The number of dispensing cavities 11 is two. The coating head 10 includes a lower die 14, a middle die 13, and an upper die 12. One dispensing cavity 11 is formed between a lower surface of the upper die 12 and an upper surface of the middle die 13, and defined as a first dispensing cavity 11*a*; and another dispensing cavity 11 is formed between a lower surface of the middle die 13 and an upper surface of the lower die 14, and defined as a second dispensing cavity 11*b*. The coating head 10 includes a lower die 14, a middle die 13, and an upper die 12. After being combined, the middle die 13 and the upper die 12 form a dispensing cavity, and the middle die 13 and the lower die 14 form another dispensing cavity 11. In this way, it is convenient to disassemble the coating head 10 for cleaning the interior of the dispensing cavity 11 and replacing parts in the dispensing cavity 11.

A first in-feed port 122 that communicates with the first dispensing cavity 11*a* is disposed on the upper die 12. The feeding apparatus 20 feeds the slurry to the first dispensing cavity 11*a* from the first in-feed port 122. A second in-feed port 141 that communicates with the second dispensing cavity 11*b* is disposed on the lower die 14. The feeding apparatus 20 feeds the slurry to the second dispensing cavity 11*b* from the second in-feed port 141.

The dispensing cavity 11 between the upper die 12 and the middle die 13 is formed between the lower surface of the upper die 12 and the upper surface of the middle die 13. The dispensing cavity 11 between the middle die 13 and the lower die 14 is formed between the lower surface of the middle die 13 and the upper surface of the lower die 14.

The first dispensing cavity 11*a* includes a first groove 121 and a second groove 131. The second groove 131 is closer to the coating opening than the first groove 121. The first groove 121 and the second groove 131 are spaced out in a first direction. A first slow flow region is formed between the first groove 121 and the second groove 131. The width of the first groove 121 is greater than the width of the second groove 131. The first in-feed port 122 is in direct communication with the first groove 121. The slurry fed from the first in-feed port 122 passes through the first groove 121, the first slow flow region, and the second groove 131 in sequence, and is finally extruded through the coating opening. From the first in-feed port 122 to the coating opening, the flow speed of the slurry declines gradually. The second groove 131 serves to reduce the flow speed of the incoming slurry, and avoid pressure distribution nonuniformity of the slurry fed from the first in-feed port 122, where the nonuniformity is caused by loss of the flow pressure of the slurry in the first dispensing cavity 11*a*. In this way, the uniformity of the slurry flow is improved.

The first groove 121 is disposed on the lower surface of the upper die 12, and the second groove 131 is disposed on the upper surface of the middle die 13, thereby not only ensuring the structural strength of the middle die 13, but also compensating for slurry pressure fluctuations and inferior flow steadiness caused by the weight of the slurry itself in a flowing process. Both the first groove 121 and the second groove 131 are arc grooves. When the slurry enters the first groove 121 and the second groove 131, the slurry can be prevented from acting vertically on walls of the first groove 121 and the second groove 131, thereby reducing the impact caused by the walls of the first groove 121 and the second groove 131 onto the slurry, and in turn, reducing the flow speed and pressure fluctuations of the slurry in the first groove 121 and the second groove 131. In some embodiments, the first groove 121 and the second groove 131 may be grooves of other shapes.

In some embodiments, the first groove 121 and the second groove 131 may be both disposed on the upper surface of the middle die 13 or both disposed on the lower surface of the upper die 12.

In some embodiments, the first dispensing cavity 11*a* may include just the first groove 121 or include just the second groove 131.

In some embodiments, the first groove 121 is disposed on the lower surface of the upper die 12, and the second groove 131 is disposed on the upper surface of the middle die 13. The width of the first groove 121 is the same as the width of the second groove 131. The first groove 121 and the second groove 131 are disposed opposite to each other to form an annular first dispensing cavity 11*a*.

The second dispensing cavity 11*b* includes a third groove 142 and a fourth groove 143. The fourth groove 143 is closer to the coating opening than the third groove 142. The third groove 142 and the fourth groove 143 are spaced out in the first direction. A second slow flow region is formed between the third groove 142 and the fourth groove 143. The width of the third groove 142 is greater than the width of the fourth groove 143. The second in-feed port 141 is in direct communication with the third groove 142. The slurry fed from the second in-feed port 141 passes through the third groove 142, the second slow flow region, and the third groove 142 in sequence, and is finally extruded through the coating opening. From the second in-feed port 141 to the coating opening, the flow speed of the slurry declines gradually. The fourth groove 143 serves to reduce the flow speed of the incoming slurry, and avoid pressure distribution nonuniformity of the slurry fed from the second in-feed port 141, where the nonuniformity is caused by loss of the flow pressure of the slurry in the second dispensing cavity 11*b*. In this way, the uniformity of the slurry flow is improved. Both the third groove 142 and the fourth groove 143 are arc grooves. When the slurry enters the third groove 142 and the fourth groove 143, the slurry can be prevented from acting vertically on walls of the third groove 142 and the fourth groove 143, thereby reducing the impact caused by the walls of the third groove 142 and the fourth groove 143 onto the slurry, and in turn, reducing the flow speed and pressure fluctuations of the slurry in the third groove 142 and the fourth groove 143. In some embodiments, the third groove 142 and the fourth groove 143 may be grooves of other shapes.

In this embodiment, the third groove 142 and the fourth groove 143 are disposed on the upper surface of the lower die 14, thereby ensuring the structural strength of the middle die 13.

In some embodiments, the third groove 142 and the fourth groove 143 may be both disposed on the lower surface of the middle die 13, or the third groove 142 and the fourth groove 143 may be disposed on the upper surface of the lower die 14 and the lower surface of the middle die 13 respectively.

The second groove 131 is disposed on the upper surface of the middle die 13, thereby not only ensuring the structural strength of the middle die 13, but also compensating for slurry pressure fluctuations and inferior flow steadiness caused by the weight of the slurry itself in a flowing process.

In some embodiments, the second dispensing cavity 11*b* may include just the third groove 142 or include just the fourth groove 143.

In some embodiments, the third groove 142 is disposed on the upper surface of the lower die 14, and the fourth groove 143 is disposed on the lower surface of the middle die 13. The width of the third groove 142 is the same as the width of the fourth groove 143. The third groove 142 and the fourth groove 143 are disposed opposite to each other to form an annular second dispensing cavity 11*b*.

To expel the air in the two dispensing cavities 11, a first exhaust port 123 and a second exhaust port 132 are disposed on the coating head 10. The first exhaust port 123 is disposed on the upper die 12, and communicates with the first dispensing cavity 11*a*. The second exhaust port 132 is disposed on the middle die 13, and communicates with the second dispensing cavity 11*b*. In some embodiments, an auxiliary exhaust port 124 is further disposed on the upper die 12. To increase the quality and efficiency of exhausting, two first exhaust ports 123 are disposed. The two first exhaust ports 123 are spaced out on the upper die 12 in a coating width direction D of the coating opening. Two second exhaust ports 132 are disposed. The two second exhaust ports 132 are spaced out on the lower die 14 in the coating width direction D of the coating opening.

In some embodiments, the coating head 10 further includes two spacers 15. The two spacers 15 are disposed between the upper die 12 and the middle die 13, and between the middle die 13 and the lower die 14, respectively. The coating opening is disposed at the spacer 15. The two spacers 15 are mounted on the lower die 14 and the middle die 13 respectively through a pressure plate 151. The pressure plate 151 is configured to support the spacer 15 and prevent leakage of the slurry at the spacer 15. The thickness of the spacer 15 can affect the coating thickness at the coating opening, and in turn, affect the coating weight. The coating weight can be adjusted by disposing spacers 15 of different thicknesses between the upper die 12 and the middle die 13, and between the middle die 13 and the lower die 14, respectively.

In some embodiments, the two spacers 15 may be mounted on the upper die 12 and the middle die 13 respectively.

In some embodiments, the coating head 10 is an integral structure. Therefore, the coating head 10 may be disposed without the spacer 15, and the size of the coating opening is formed by machining.

In some embodiments, the upper die 12 is pivotally connected to the middle die 13, and the middle die 13 is pivotally connected to the lower die 14, so that all components of the coating head 10 are always connected together, and it is ensured that the relative position between the lower die 14, the middle die 13, and the upper die 12 is fixed. In clamping the lower die 14 to the middle die 13 or clamping the middle die 13 to the upper die 12, the two dies can be clamped together accurately without a need to recalibrate the positions of the dies. The upper die 12 is pivotally connected to the middle die 13 by a first hinge 16, and the middle die 13 is pivotally connected to the lower die 14 by a second hinge 17.

The coating head 10 further includes a first die-clamping piece 18 and a second die-clamping piece 19. The first die-clamping piece 18 is configured to fix the upper die 12 and the middle die 13 when clamping the upper die 12 to the middle die 13. The second die-clamping piece 19 is configured to fix the middle die 13 and the lower die 14 when clamping the middle die 13 to the lower die 14. When the upper die 12 and the middle die 13 are clamped together, the first die-clamping piece 18 is connected to the upper die 12 and the middle die 13 concurrently to keep firm connection between the upper die 12 and the middle die 13. When the lower die 14 and the middle die 13 are clamped together, the second die-clamping piece 19 is connected to the lower die 14 and the middle die 13 concurrently to keep firm connection between the lower die 14 and the middle die 13. The first die-clamping piece 18 and the second die-clamping piece 19 can implement firm connection between the upper die 12 and the middle die 13, and between the middle die 13 and the lower die 14, respectively, so as to ensure stability of pressure and flow speed of the slurry in the two dispensing cavities 11, and in turn, improve the coating quality. The first die-clamping piece 18 and the second die-clamping piece 19 may be connecting pieces such as screws and bolts.

To further keep firm connection between the upper die 12, the middle die 13, and the lower die 14 in a die-clamping state, the coating head 10 further includes a fixing back plate 190. One end of the fixing back plate 190 is detachably connected to the middle die 13, and the other end of the fixing back plate 190 is detachably connected to the lower die 14.

The coating head 10 further includes a flip lever 191. There may be one flip lever 191 mounted on the middle die 13. Alternatively, there may be a plurality of flip levers 191. For example, there are two flip levers 191. The two flip levers 191 are mounted on the upper die 12 and the middle die 13 respectively, or the two flip levers 191 are mounted on the middle die 13 and the lower die 14 respectively, or the two flip levers 191 are mounted on the upper die 12 and the lower die 14 respectively. For another example, there are three flip levers 191. The three flip levers 191 are mounted on the upper die 12, the middle die 13, and the lower die 14 respectively.

When cleaning the first dispensing cavity 11*a* or replacing the spacer 15 between the upper die 12 and the middle die 13, the operator detaches the first die-clamping piece 18, and holds the flip lever 191 in hand to open the upper die 12 around a rotation axis of the first hinge 16, so as to clean the first dispensing cavity 11$a$ or replace the spacer 15. When cleaning the second dispensing cavity 11$b$ or replacing the spacer 15 between the lower die 14 and the middle die 13, the operator detaches the second die-clamping piece 19 and the fixing back plate 190, and holds the flip lever 191 in hand to open the middle die 13 around a rotation axis of the second hinge 17, so as to clean the second dispensing cavity 11$b$ or replace the spacer 15.

In some embodiments, the coating head 10 further includes a tuning mechanism 192. The tuning mechanism 192 is configured to adjust the coating flow at the coating opening. The tuning mechanism 192 is a micrometer tuning mechanism 192. The micrometer tuning mechanism 192 is a tuning mechanism 192 with a tuning precision as high as the precision of a micrometer, so as to improve the tuning precision. The tuning mechanism 192 is mounted on the upper die 12 through a fixing plate 1921 and a fastening screw 1922. There are a plurality of tuning mechanisms 192. The plurality of tuning mechanisms 192 are spaced out along a coating width direction D of the coating opening, so as to adjust the coating flow in a part or all of the region in the width direction.

The coating head 10 further includes a tuning push-pull rod 193 to adjust the weight of the lower die 14. The push-pull rod is threadedly connected to a U-shaped groove that is of the lower die 14 and that is close to the back side of the lip. A push-pull torque is applied to adjust the opening size of the lip. In practice, the tuning mechanism 192 and the tuning push-pull rod 193 adjust the opening size of the lip by adjusting an area of the coating opening of the dispensing cavity 11, where the area is blocked by the tuning mechanism 192 and the tuning push-pull rod 193. When the coating opening area blocked by the tuning mechanism 192 and the tuning push-pull rod 193 is larger, the opening size of the lip is smaller, and the coating weight is smaller. When the coating opening area blocked by the tuning mechanism 192 and the tuning push-pull rod 193 is smaller, the opening size of the lip is larger, and the coating weight is greater.

In some embodiments, the coating head 10 may be an integral structure instead. The dispensing cavity 11 and the coating opening are formed by machining the coating head 10.

In some embodiments, the coating system 100 further includes a back roller 90. The substrate 200 is wound around the back roller 90. The back roller 90 is configured to drive the substrate 200. When the back roller 90 rotates, friction between the back roller 90 and the substrate 200 can drive the substrate 200 to move along an extension direction of the substrate 200.

An out-feed direction of each coating opening coincides with an extension direction of a diameter of the back roller 90. The out-feed direction of the coating opening is along a diameter direction of the back roller 90, thereby preventing the lip of the coating head 10 from scraping the slurry.

In some embodiments, an out-feed direction of the coating opening of one dispensing cavity 11 among all the dispensing cavities 11 is arranged horizontally. The horizontal direction C is perpendicular to the vertical direction. The out-feed direction of one of the coating openings of the coating head 10 is arranged horizontally, thereby preventing the lip of the coating head 10 from scraping the slurry. In addition, the coating head 10 vibrates up and down during a coating operation. When the coating head 10 vibrates up and down, the horizontally arranged coating opening changes positions merely in the vertical direction, but a horizontal distance between the coating opening and a center of the back roller 90 changes scarcely. The impact thereby caused on the coating thickness of the slurry out of the coating opening is small, thereby helping to ensure coating quality.

When the back roller 90 drives the substrate 200 to move at a high speed, air is brought to the coating opening to cause instability of the airflow at the coating opening. The slurry extruded from an nozzle of the coating opening is very thin. If an unstable airflow keeps perturbing the coating opening, affinity between the slurry and the substrate 200 will decline, bubbles and foil scraps will occur in the slurry applied on the substrate 200, and the coating effect will be inferior. In addition, the uniformity of the coating will be impaired by the non-uniform air retained at the coating opening. This phenomenon is severer especially when the slurry viscosity and the solid content are relatively low.

In view of this, in some embodiments, the coating system 100 further includes an adsorption apparatus 110 (referring to FIG. 3). The adsorption apparatus 110 is configured to keep the air pressure stable at the coating opening. The adsorption device 110 is a vacuum apparatus. The adsorption apparatus 110 includes a vacuum pump. A suction port of the vacuum pump is located upstream of the coating head 10. The suction port of the adsorption apparatus 110 takes in air upstream of the coating head, and can keep the air pressure stable at the coating opening from upstream of the coating head 10, so as to prevent the slurry at the coating opening from being affected by air flow fluctuations, increase affinity between the slurry and the substrate 200, increase coating uniformity, and in turn, improve the coating quality. It is hereby noted that "upstream" means an earlier step of a processing process, and "a step performed upstream of the coating head 10" means a step performed before the coating step.

In some embodiments, an adhesive dispensing valve 194 is disposed on the coating head 10. The adhesive dispensing valve 194 is mounted on the lower die 14. The adhesive dispensing valve 194 is configured to dispense an insulation adhesive at tabs of an electrode plate.

Figure 7:
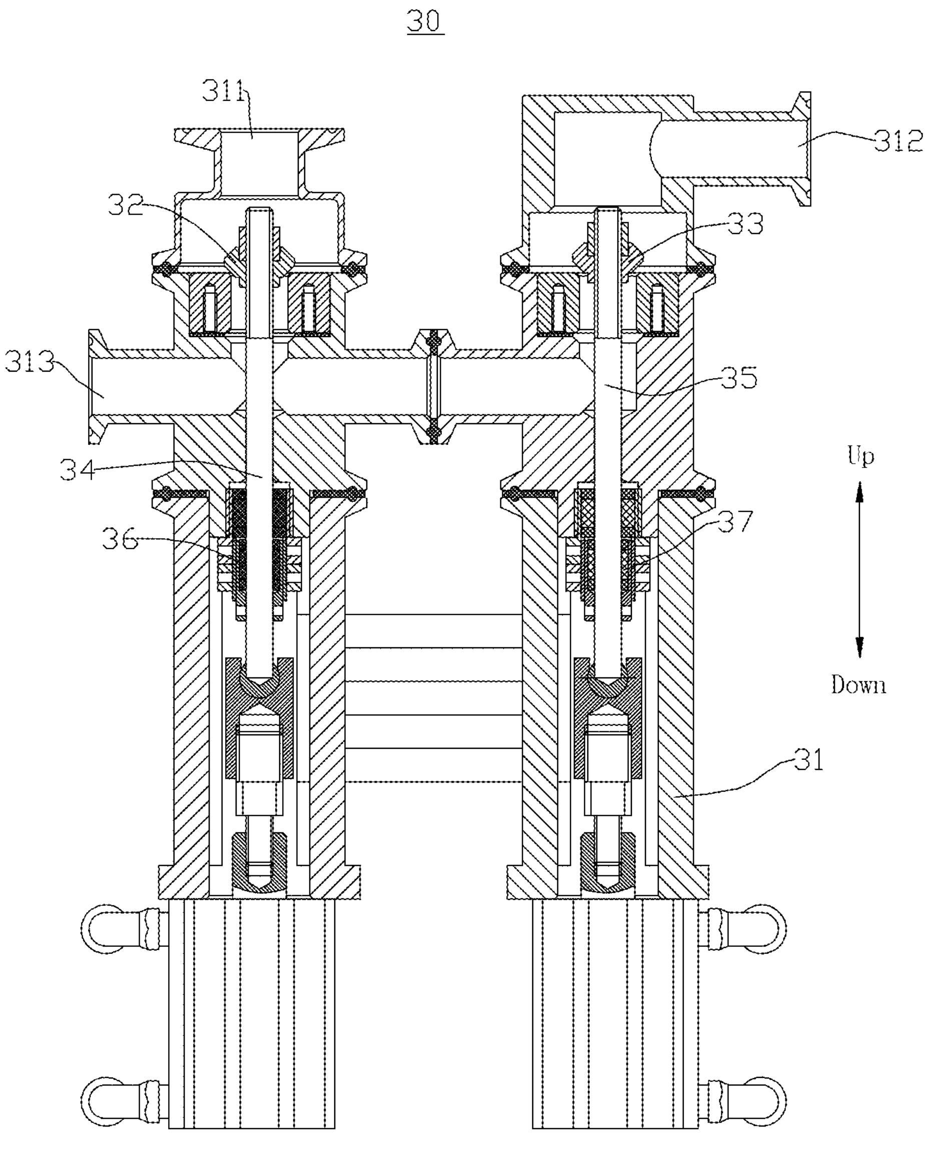
FIG. 7 is a schematic diagram of a valve shown in FIG. 1.

In some embodiments, referring to FIG. 7, FIG. 7 is a schematic structural diagram of a valve 30. The valve 30 includes a valve body 31, a first valve core 32, a second valve core 33, a first drive component 34, and a second drive component 35. The valve body 31 includes an in-feed port 311, a back-feed port 313, and an out-feed port 312. The out-feed port 312 communicates with the dispensing cavity 11, the in-feed port 311 communicates with an outlet of the feeding pump 22, and the back-feed port 313 communicates with the tank 21. The first drive component 34 is configured to drive the first valve core 32 to move in the valve body 31, so as to implement communication or disconnection between the in-feed port 311 and the out-feed port 312. The second drive component 35 is configured to drive the second valve core 33 to move in the valve body 31, so as to implement communication or disconnection between the out-feed port 312 and the back-feed port 313.

Both the first drive component 34 and the second drive component 35 are linear driving mechanisms, such as air cylinders, and electric linear actuators. The first drive component 34 is fixedly mounted on the valve body 31. The first valve core 32 is fixed onto an output end of the first drive component 34. The second drive component 35 is fixedly mounted onto an output end of the second drive component 35. To implement coating, the first drive component 34 drives the first valve core 32 to move upward, so that the in-feed port 311 communicates with the out-feed port 312, and therefore, the feeding pump 22 can pump the slurry into the dispensing cavity 11. The second drive component 35 drives the second valve core 33 to move downward, so that the out-feed port 312 is disconnected from the back-feed port 313, and therefore, the slurry in the dispensing cavity 11 is unable to flow back to the tank 21. When no coating is required, the first drive component 34 drives the first valve core 32 to move downward, so that the in-feed port 311 is disconnected from the out-feed port 312, and therefore, the slurry is unable to enter the dispensing cavity 11 from the in-feed port. The second drive component 35 drives the second valve core 33 to move upward, so that the out-feed port 312 communicates with the back-feed port 313, and therefore, the slurry in the dispensing cavity 11 flows back to the tank 21. When the in-feed port 311 is in communication with the out-feed port 312, before the movement of the first valve core 32 causes the slurry to flow into the dispensing cavity 11, the first valve core 32 does not directly act on the slurry, and will not affect the slurry pressure. When the back-feed port 313 is in communication with the out-feed port 312, before the movement of the second valve core 33 causes the slurry to flow into the tank 21, the second valve core 33 does not directly act on the slurry, and will not affect the slurry pressure, thereby improving the coating quality.

The backflow of the slurry may be implemented by virtue of flow characteristics of the slurry itself, or may be implemented by a power apparatus similar to the feeding pump 22. The valve 30 can feed the slurry to the coating head 10, and can implement backflow of the slurry. When no coating is required, the slurry can flow back in time to prevent the slurry in the dispensing cavity 11 from affecting effects of clearance coating or local thin coating.

The valve 30 further includes a first sealing structure 36 and a second sealing structure 37. The first sealing structure 36 is disposed between the valve body 31 and the output end of the first drive component 34. The second sealing structure 37 is disposed between the valve body 31 and the output end of the second drive component 35.

In some embodiments, the valve 30 may be an on-off valve capable of implementing communication or disconnection between the dispensing cavity 11 and the feeding apparatus 20 but not necessarily capable of backflow.

The foregoing descriptions are merely exemplary embodiments of this application, but are not intended to limit this application. A person skilled in the art understands that this application may have various modifications and variations. Any modifications, equivalent replacements, improvements, and the like made without departing from the spirit and principles of this application still fall within the protection scope of this application.

What is claimed is:

1. A coating system, applied to coating a substrate to form an electrode plate, comprising:

a coating head, equipped with two dispensing cavities independent of each other, wherein each of the dispensing cavities comprises a coating opening;

two feeding apparatuses connected to the dispensing cavities in a one-to-one correspondence to form two combinations composed of the dispensing cavities and the feeding apparatuses, each of the two combinations comprising a dispensing cavity and a feeding apparatus, and configured to feed a slurry to the dispensing cavities;

a valve disposed between the dispensing cavity and the feeding apparatus in at least one of the two combinations composed of the dispensing cavities and the feeding apparatuses, and configured to implement communication or disconnection between the dispensing cavity and the feeding apparatus;

the coating head comprises a lower die, a middle die, and an upper die;

one of the dispensing cavities is formed between a lower surface of the upper die and an upper surface of the middle die, and another one of the dispensing cavities is formed between a lower surface of the middle die and an upper surface of the lower die, one of the dispensing cavities includes a first groove and a second groove spaced out in a first direction, a width of the first groove is greater than a width of the second groove, and the second groove is closer to the coating opening than the first groove, both the first groove and the second groove are arc grooves, the another one of the dispensing cavities includes a third groove and a fourth groove spaced out in the first direction, a width of the third groove is greater than a width of the fourth groove, and the fourth groove is closer to the coating opening than the third groove, both the third groove and the fourth groove are arc grooves;

the coating head further comprises two spacers, and the two spacers are disposed between the upper die and the middle die, and between the middle die and the lower die, respectively;

the coating opening is disposed at the spacer;

each of the feeding apparatuses comprises a tank and a feeding pump, and the feeding pump is configured to pump the slurry in the tank to one of the dispensing cavities;

the valve comprises a valve body, a first valve core, a second valve core, a first drive structure, and a second drive structure;

the valve body comprises an in-feed port, a back-feed port, and an out-feed port, the out-feed port communicates with one of the dispensing cavities, the in-feed port communicates with an outlet of the feeding pump, and the back-feed port communicates with the tank;

the first drive structure drives the first valve core to move in the valve body so as to implement communication or disconnection between the in-feed port and the out-feed port;

the second drive structure drives the second valve core to move in the valve body so as to implement communication or disconnection between the out-feed port and the back-feed port;

when coating is implemented, the first drive structure drives the first valve core to open, so that the in-feed port communicates with the out-feed port, the second drive structure drives the second valve core to close, so that the out-feed port is disconnected from the back-feed port;

when no coating is required, the first drive structure drives the first valve core to close, so that the in-feed port is disconnected from the out-feed port, the second drive structure drives the second valve core to open, so that the out-feed port communicates with the back-feed port;

wherein the one of the dispensing cavities further includes a flow channel connecting the first groove, the second groove, and the coating opening, and the width of the second groove is greater than a width of the flow channel, and the second groove is configured to reduce flow speed of the incoming slurry;

the first groove having only an arc shape is disposed only inside one of the upper die or the lower die; and a surface of the upper die facing the middle die includes the first groove, a surface of the middle die facing the upper die includes the second groove, a surface of the middle die facing the lower die is flat, and a surface of the lower die facing the middle die includes both the third groove and the fourth groove.

2. The coating system according to claim 1, wherein the coating system further comprises a back roller, and the back roller is configured to drive the substrate; and an out-feed direction of each coating opening coincides with an extension direction of a diameter of the back roller.

3. The coating system according to claim 1, wherein an out-feed direction of the coating opening of one of the at least two dispensing cavities is arranged horizontally.

4. The coating system according to claim 1, wherein the coating system further comprises an adsorption structure to keep an air pressure stable at the coating opening.

5. The coating system according to claim 1, wherein the coating system further comprises a marker located downstream of the coating head to mark an uncoated region of the substrate to identify a thin-coated position or an uncoated position.

6. The coating system according to claim 1, wherein the upper die is pivotally connected to the middle die, and the middle die is pivotally connected to the lower die; and the coating head further comprises a first die-clamping structure and a second die-clamping structure, the first die-clamping structure fixes the upper die and the middle die when clamping the upper die to the middle die, and the second die-clamping structure fixes the middle die and the lower die when clamping the middle die to the lower die.

7. The coating system according to claim 1, wherein the first groove and the second groove are disposed on opposite sides of the flow channel respectively.

8. The coating system according to claim 1, wherein a cross section of the middle die is a triangular shape, the dispensing cavities are located at an angle of the triangular shape facing the shortest side of the triangular shape, and the first groove, the flow channel, the second groove, and the coating opening are distributed along one of sides, except the shortest side, of the triangular shape.

9. A coating system, applied to coating a substrate to form an electrode plate, comprising:

a coating head, equipped with two dispensing cavities independent of each other, wherein each of the dispensing cavities comprises a coating opening;

two feeding apparatuses connected to the dispensing cavities in a one-to-one correspondence to form two combinations composed of the dispensing cavities and the feeding apparatuses, each of the two combinations comprising a dispensing cavity and a feeding apparatus, and configured to feed a slurry to the dispensing cavities;

a valve disposed between the dispensing cavity and the feeding apparatus in at least one of the two combinations composed of the dispensing cavities and the feeding apparatuses, and configured to implement communication or disconnection between the dispensing cavity and the feeding apparatus;

one of the dispensing cavities includes a first groove and a second groove spaced out in a first direction, a width of the first groove is greater than a width of the second groove, and the second groove is closer to the coating opening than the first groove, both the first groove and the second groove are arc grooves, another one of the dispensing cavities includes a third groove and a fourth groove spaced out in the first direction, a width of the third groove is greater than a width of the fourth groove, and the fourth groove is closer to the coating opening than the third groove, both the third groove and the fourth groove are arc grooves;

each of the feeding apparatuses comprises a tank and a feeding pump, and the feeding pump is configured to pump the slurry in the tank to one of the dispensing cavities;

the valve comprises a valve body, a first valve core, a second valve core, a first drive structure, and a second drive structure;

the valve body comprises an in-feed port, a back-feed port, and an out-feed port, the out-feed port communicates with one of the dispensing cavities, the in-feed port communicates with an outlet of the feeding pump, and the back-feed port communicates with the tank;

the first drive structure drives the first valve core to move in the valve body so as to implement communication or disconnection between the in-feed port and the out-feed port;

the second drive structure drives the second valve core to move in the valve body so as to implement communication or disconnection between the out-feed port and the back-feed port;

when coating is implemented, the first drive structure drives the first valve core to open, so that the in-feed port communicates with the out-feed port, the second drive structure drives the second valve core to close, so that the out-feed port is disconnected from the back-feed port;

when no coating is required, the first drive structure drives the first valve core to close, so that the in-feed port is disconnected from the out-feed port, the second drive structure drives the second valve core to open, so that the out-feed port communicates with the back-feed port;

wherein the one of the dispensing cavities further includes a flow channel connecting the first groove, the second groove, and the coating opening, and the width of the second groove is greater than a width of the flow channel, and the second groove is configured to reduce flow speed of the incoming slurry;

the first groove having only an arc shape is disposed only inside one of the upper die or the lower die; and a surface of the upper die facing the middle die includes the first groove, a surface of the middle die facing the upper die includes the second groove, a surface of the middle die facing the lower die is flat, and a surface of the lower die facing the middle die includes both the third groove and the fourth groove.

10. The coating system of claim 9, wherein the first groove and the second groove are disposed on opposite sides of the flow channel respectively.

11. The coating system according to claim 9, wherein a cross section of the middle die is a triangular shape, the dispensing cavities are located at an angle of the triangular shape facing the shortest side of the triangular shape, and the first groove, the flow channel, the second groove, and the coating opening are distributed along one of sides, except the shortest side, of the triangular shape.

* * * * *